United States Patent Office 3,259,502
Patented July 5, 1966

3,259,502
ALCOHOL GENERATING DEVICE AND METHOD
Robert Ehrlich, Morristown, and Archie R. Young II, Montclair, N.J., assignors to Thiokol Chemical Corporation, Bristol, Pa., a corporation of Delaware
No Drawing. Filed July 17, 1962, Ser. No. 210,548
15 Claims. (Cl. 99—30)

This invention relates to an ethyl alcohol generating device for rapidly generating relatively small quantities of aqueous alcohol adapted to be used for beverage and other purposes.

It is an object of the present invention to provide a readily storable and chemically and physically stable alcohol generating device that is adapted when immersed in water at room temperature to produce an ethyl alcohol solution which is potable and which is also useful for other known applications of aqueous alcohol solutions. It is another object of the invention to provide a simple, inexpensive and effective method of producing small quantities of aqueous ethyl alcohol for beverage, medicinal and other purposes. Other objects of the invention will be in part obvious and in part pointed out hereafter.

The objects and advantages of the invention are achieved in general by placing in a water-permeable container a quantity of an ethoxide that reacts with water to form ethanol. The container is then immersed in a quantity of water, whereupon the water passes through the walls of the permeable container to react with the ethoxide in the container to form ethanol which passes outwardly through the container wall and dissolves in the water to form aqueous ethyl alcohol. The permeable container may be made, for example, of a textile fabric or of a porous paper that has been treated to inhibit its tendency to disintegrate in water.

In accordance with a preferred embodiment of the invention, the container is a small, finely porous bag made of a water-resistant paper similar to that used in making tea bags. An ethoxide of a metal that forms an insoluble hydroxide is employed. The bag is "dunked" in a quantity of water, and preferably manipulated therein, to cause water penetrating the bag wall to react with the ethoxide to form ethanol and an insoluble hydroxide. The ethyl alcohol formed dissolves to produce an alcohol solution, and the insoluble hydroxide remains within the bag and is removed from the solution therein. It is desirable that the bag be squeezed before or after removal from the solution to express alcohol solution from the solid hydroxide in the bag. Acceptable alcohol generation can be obtained using water at room temperature, although water at higher or lower temperatures can be used if desired.

Typical ethoxides that may be employed in accordance with the invention are aluminum and magnesium ethoxides and ethyl orthocarbonate. In cases where the alcohol solution formed is to be used for beverage purposes, the ethoxides of aluminum and/or magnesium are desirably used, since the hydroxides of these metals are known to be nontoxic and physiologically innocuous. Hence if a small amount of the hydroxide passes through the bag wall, no adverse physiological effect will result when the alcohol solution is subsequently imbibed. If desired, the ethoxide can be mixed with suitable water-soluble or alcohol-soluble flavoring ingredients to produce a flavored alcohol solution. In this way the present device can be used to produce "instant" cocktails.

In cases where the present alcohol generating devices are to be stored for an extensive period before use, they are desirably encased in a water-impermeable protective envelope. The protective envelope may conveniently be a plastic bag made of a material such as polyethylene, or Saran, Mylar or cellophane film. Data are given in the examples concerning the relative effectiveness of several types plastic envelopes in maintaining the stability of the present devices in storage.

In order to point out more fully the nature of the present invention, the following specific examples are given of typical embodiments of the present device and their mode of use.

Example 1

10 grams of aluminum ethoxide was packaged in a bag made of Whatman No. 54 filter paper of a size comparable to that of a conventional tea bag. The closed bag was suspended in 90 ml. of water. By alternately squeezing and releasing pressure on the bag while it was immersed in water, substantially complete liberation of the ethanol was achieved in the course of a few minutes. The bag was squeezed to express ethanol solution from the hydroxide contained therein and removed. The resulting solution had a specific gravity of 0.987 and contained 8.1% by volume ethanol. Thus the ethanol produced was substantially the same as would have been produced by using unbagged aluminum ethoxide.

Example 2

Several samples of aluminum ethoxide, identified as A, B and C, each weighing 32.4 grams, were hydrolyzed in 63 ml. of water. In the case of sample A the aluminum ethoxide was added to water in unbagged form and stirred therein to produce the desired hydrolysis. Samples B and C were packaged in filter paper as in Example 1. Sample B was immersed in the water without agitation, whereas sample C was manipulated while immersed in the water by alternate squeezing and release of pressure. The alcohol concentrations achieved in these three tests and the specific gravities of the resulting aqueous ethanol solutions are summarized in Table I.

TABLE 1

| Sample | Weight Percent Ethanol | Volume Percent Ethanol | Specific Gravity |
|---|---|---|---|
| A | 30.5 | 36.8 | 0.953 |
| B | 11.4 | 14.1 | 0.980 |
| C | 26.4 | 32.1 | 0.960 |

Example 3

50.6 grams of aluminum ethoxide in a filter paper bag of the type referred to in Example 1 was hydrolyzed in 50 ml. of water. Because of the relatively large quantity of aluminum ethoxide used, the residual solids absorbed a considerable part of the aqueous ethanol formed. However, it was found that by firmly pressing the bag, most of the aqueous ethanol could be expressed therefrom. The resulting aqueous ethanol had a specific gravity of 0.888 and contained about 69% ethanol by volume. This example shows that it is possible to produce relatively concentrated alcohol solutions by the present method.

Example 4

41 grams of magnesium ethoxide packaged in a paper bag was hydrolyzed in 55 ml. of water. It was found that the magnesium hydroxide formed was considerably less voluminous than the aluminum hydroxide produced from an equivalent amount of aluminum ethoxide. However, the magnesium hydroxide had a smaller particle size and a somewhat greater tendency to pass through the bag walls into the ethanol solution.

After squeezing and removal of the bag, the remaining ethanol solution comprised 72 ml. having a specific gravity of 0.936 and containing 49.2% by volume ethanol. This compares with a theoretical yield of 83 ml. of 50% ethanol.

Example 5

To determine the effectiveness of storing the bags of ethoxides in moisture-proof wrappings, 10-gram samples of aluminum ethoxide were placed in filter paper bags, then encased in sealed bags prepared from various transparent, commercially available plastic packaging films and maintained at room temperature and 100% relative humidity for varying periods of time. At the end of the storage period, the filter bag was removed from its plastic case, dried in vacuo at 100° C., hydrolyzed in water, and the specific gravity of the resulting ethanol solution determined. The results of these tests are given in Table II wherein the first column lists the material from which the package was made, the second column the film thickness of the packaging material in mils, the third column the storage time in days, and the fourth column the specific gravity of the resulting ethanol solution.

TABLE II

| Film | Thickness | Time | Specific Gravity |
|---|---|---|---|
| None | | 1 | 0.997 |
| Cellophane | 2 | 3 | 0.993 |
| Mylar | 2 | 3 | 0.990 |
| Polyethylene | 2 | 3 | 0.986 |
| Do | 2 | 7 | 0.986 |
| Do | 2 | 10 | 0.986 |
| Do | 2 | 17 | 0.988 |
| Saran | 1 | 3 | 0.986 |
| Do | 1 | 14 | 0.986 |
| Do | 1 | 27 | 0.987 |

The data of the foregoing table show that moisture-proof envelopes made from polyethylene and Saran films are especially effective in preventing the premature decomposition of ethoxides in the water-permeable bags of the present invention due to penetration of moist air through the permeable bag walls to the ethoxide.

It is of course to be understood that the foregoing examples are intended to be illustrative only and that numerous changes can be made in the ingredients, proportions and conditions illustratively set forth therein without departing from the spirit of the invention as defined in the appended claims.

We claim:

1. An ethyl alcohol generating device comprising a water-permeable, water-insoluble container containing an ethoxide of a metal having an insoluble hydroxide, said container being substantially impermeable to said insoluble hydroxide.

2. An ethyl alcohol generating device comprising a water-permeable, water-insoluble bag containing an ethoxide of a metal having an insoluble hydroxide, said bag being substantially impermeable to said insoluble hydroxide and being encased in a sealed impermeable plastic envelope.

3. An ethyl alcohol generating device comprising a water-permeable, water-insoluble bag containing an ethoxide of a metal having a water-insoluble hydroxide, said bag being substantially impermeable to said insoluble hydroxide.

4. A device according to claim 1 and wherein said ethoxide is aluminum ethoxide.

5. A device according to claim 1 and wherein said ethoxide is magnesium ethoxide.

6. A device according to claim 1 and wherein said ethoxide is ethyl orthocarbonate.

7. A device according to claim 1 and wherein said container is made of paper.

8. A device according to claim 1 and wherein said container is made of a textile fabric.

9. An ethyl alcohol generating device comprising a water-permeable, water-insoluble bag containing a mixture of an ethoxide of a metal having a water-insoluble hydroxide and a flavoring material, said bag being substantially impermeable to said insoluble hydroxide.

10. An ethyl alcohol generating device comprising a water-permeable, water-insoluble bag containing a mixture of an ethoxide of a metal having a water-insoluble hydroxide and a flavoring material, said bag being substantially impermeable to said insoluble hydroxide and being encased in a sealed impermeable plastic envelope.

11. The method of making aqueous ethanol which comprises immersing in a quantity of water a water-permeable, water-insoluble bag containing an ethoxide of a metal having an insoluble hydroxide, said bag being substantially impermeable to said insoluble hydroxide, and manipulating said bag while it is immersed to cause said ethoxide to hydrolyze to form ethanol which dissolves in said water.

12. The method of making aqueous ethanol which comprises immersing in a quantity of water a water-permeable, water-insoluble bag containing an ethoxide of a metal which forms a water-insoluble hydroxide, said bag being substantially impermeable to said insoluble hydroxide, manipulating said bag while it is immersed to cause said ethoxide to hydrolyze to form an insoluble hydroxide and ethanol which dissolves in said water and squeezing said bag to express said dissolved ethanol therefrom.

13. The method of making aqueous ethanol which comprises immersing in a quantity of water a water-resistant paper bag containing an ethoxide of a metal that forms an insoluble hydroxide, said bag being substantially impermeable to said insoluble hydroxide, manipulating said bag while it it immersed to cause said ethoxide to hydrolyze to form an insoluble hydroxide and ethanol which dissolves in said water, squeezing said bag to express dissolved ethanol therefrom and removing said bag containing said insoluble hydroxide from said quantity of water.

14. A method according to claim 13 and wherein said ethoxide is aluminum ethoxide.

15. A method according to claim 14 and wherein said aluminum ethoxide is mixed with a flavoring material.

References Cited by the Examiner

UNITED STATES PATENTS

| | | | |
|---|---|---|---|
| 2,537,453 | 1/1951 | Frangialli | 99—78 |
| 2,878,927 | 3/1959 | Haley | 99—77.1 |
| 2,889,035 | 6/1959 | Shaw | 99—77.1 |

OTHER REFERENCES

Karper, Organic Chemistry, 2nd ed., 1946, Elsevier Pub. Co., Inc., New York, pp. 80–83.

A. LOUIS MONACELL, *Primary Examiner.*

D. M. STEPHENS, *Assistant Examiner.*